US010200772B2

(12) United States Patent
Ahn et al.

(10) Patent No.: US 10,200,772 B2
(45) Date of Patent: Feb. 5, 2019

(54) DISPLAY APPARATUS (71) Applicant: Samsung Display Co., Ltd., Yongin, Gyeonggi-Do (KR)

(72) Inventors: Yi Joon Ahn, Seoul (KR); Yongchang Park, Seoul (KR); WonSang Park, Yongin-si (KR); Jongin Baek, Suwon-si (KR); Yong-Suk Yeo, Seongnam-si (KR); Taehee Lee, Gumi-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/685,925

(22) Filed: Apr. 14, 2015

(65) Prior Publication Data

US 2015/0341714 A1    Nov. 26, 2015

(30) Foreign Application Priority Data

May 20, 2014 (KR) .................. 10-2014-0060428

(51) Int. Cl.
*H04R 7/04* (2006.01)
*H04R 1/02* (2006.01)
*G06F 1/16* (2006.01)
*H04M 1/03* (2006.01)
*H04R 17/00* (2006.01)

(52) U.S. Cl.
CPC ........... *H04R 1/028* (2013.01); *G06F 1/1688* (2013.01); *H04M 1/03* (2013.01); *H04R 7/045* (2013.01); *G06F 1/1652* (2013.01); *H04R 17/00* (2013.01); *H04R 2400/03* (2013.01); *H04R 2499/11* (2013.01); *H04R 2499/15* (2013.01)

(58) Field of Classification Search
CPC ........ G06F 1/1688; H04M 1/03; H04R 7/045; H04R 1/028; H04R 2499/11; H04R 17/00; H04R 2400/03; H04R 2499/01
USPC ....... 381/333, 388, 306, 336, 111, 190, 150; 257/688; 348/739; 345/30, 55, 84, 87, 345/104; 310/327, 326, 311
See application file for complete search history.

(56) References Cited

U.S. PATENT DOCUMENTS

| 5,621,263 | A | * | 4/1997 | Kaida ................. H03H 9/0595 310/326 |
| 5,977,867 | A | | 11/1999 | Blouin |
| 6,003,766 | A | | 12/1999 | Azima et al. |
| 6,169,809 | B1 | | 1/2001 | Azima et al. |
| 6,243,473 | B1 | | 6/2001 | Azima et al. |
| 6,266,426 | B1 | | 7/2001 | Azima et al. |
| 6,285,770 | B1 | | 9/2001 | Azima et al. |
| 6,324,052 | B1 | | 11/2001 | Azima et al. |

(Continued)

FOREIGN PATENT DOCUMENTS

| CN | 1356779 A | 7/2002 |
| CN | 1655645 A | 8/2005 |

(Continued)

*Primary Examiner* — Vivian Chin
*Assistant Examiner* — Con P Tran
(74) *Attorney, Agent, or Firm* — Cantor Colburn LLP (57) ABSTRACT A display apparatus includes a display panel which displays an image and a vibration member attached to a surface of the display panel, where the vibration member receives a sound signal, generates a vibration in response to the sound signal, and transfers the vibration to the display panel to allow the display panel to output a sound.

30 Claims, 9 Drawing Sheets

(56) References Cited

U.S. PATENT DOCUMENTS

| | | | |
|---|---|---|---|
| D455,131 S | 4/2002 | Reynaga et al. | |
| 6,389,935 B1 | 5/2002 | Azima et al. | |
| 7,639,826 B1 | 12/2009 | Azima et al. | |
| 7,792,319 B2 | 9/2010 | Kimura et al. | |
| 8,934,228 B2 | 1/2015 | Franklin et al. | |
| 2001/0006006 A1 | 7/2001 | Hill | |
| 2002/0027999 A1* | 3/2002 | Azima | B42D 15/022 381/431 |
| 2002/0065113 A1 | 5/2002 | Mori | |
| 2002/0075135 A1 | 6/2002 | Bown | |
| 2003/0059069 A1 | 3/2003 | Bank et al. | |
| 2004/0133366 A1 | 7/2004 | Sullivan et al. | |
| 2005/0129267 A1 | 6/2005 | Azima et al. | |
| 2005/0147274 A1 | 7/2005 | Azima et al. | |
| 2006/0120542 A1 | 6/2006 | Lee et al. | |
| 2007/0206822 A1 | 9/2007 | Whitwell et al. | |
| 2010/0158283 A1* | 6/2010 | Kim | H04R 17/00 381/190 |
| 2012/0243719 A1 | 9/2012 | Franklin et al. | |

FOREIGN PATENT DOCUMENTS

| | | |
|---|---|---|
| CN | 1780494 A | 5/2006 |
| GB | 2360901 A | 10/2001 |

\* cited by examiner

DISPLAY APPARATUS

This application claims priority to Korean Patent Application No. 10-2014-0060428, filed on May 20, 2014, and all the benefits accruing therefrom under 35 U.S.C. § 119, the content of which in its entireties is herein incorporated by reference.

BACKGROUND

1. Field

The disclosure relates to a display apparatus. More particularly, the disclosure relates to a display apparatus having improved sound output characteristics.

2. Description of the Related Art

An electronic device that displays an image, such as a smart phone, a digital camera, a notebook computer, a navigation device or a smart television, for example, typically includes a display panel to display the image.

A flat display panel having thin thickness and light weight, e.g., a liquid crystal display panel, an organic light emitting display panel, a plasma display panel, an electrophoretic display panel, etc., is widely used as such a display panel. In addition, the electronic device typically includes a speaker to output a sound signal.

SUMMARY

The disclosure provides a display apparatus having improved sound output characteristics.

According to an exemplary embodiment of the invention, a display apparatus includes a display panel which displays an image, and a vibration member attached to a surface of the display panel, where the vibration member receives a sound signal, generates a vibration in response to the sound signal, and transfers the vibration to the display panel to allow the display panel to output a sound.

In an exemplary embodiment, the display panel includes a first surface which displays the image thereon and a second surface opposite to the first surface, and the vibration member is attached to the second surface.

In an exemplary embodiment, the display apparatus may further include a vibration control plate disposed between the vibration member and the display panel, where the vibration control plate controls a vibration frequency of the vibration transferred to the display panel from the vibration member.

In an exemplary embodiment, the vibration member may be attached to a surface of the vibration control plate.

In an exemplary embodiment, the display apparatus may further include a damping member attached to at least one of the vibration control plate and the vibration member, where the damping member absorbs the vibration of the display panel.

In an exemplary embodiment, the display apparatus may further include a cover part which covers the display panel, the vibration member and the damping member.

In an exemplary embodiment, the cover part may include a bottom portion and a sidewall extending from the bottom portion, the display apparatus may further include an edge attached to the sidewall, and the display panel may be coupled to the sidewall by the edge such that the display panel vibrates in directions substantially perpendicular to a surface thereof.

In an exemplary embodiment, the damping member may be coupled to the cover part.

In an exemplary embodiment, the damping member may include a first damping member disposed at a side of the display panel in a first direction and a second damping member disposed at a side of the display panel in a second direction opposite to the first direction, and the vibration member may be disposed between the first and second damping members.

In an exemplary embodiment, the damping member may include a first damping member disposed at a side of the display panel in a first direction and a second damping member disposed at a side of the display panel in a second direction opposite to the first direction. In such an embodiment, the vibration member may include a first vibration member disposed in the first direction from the first damping member and a second vibration member disposed in the second direction from the second damping member.

In an exemplary embodiment, a damping control recess may be defined in the damping member in a direction substantially parallel to the surface of the display panel.

In an exemplary embodiment, the display panel may have a curved shape.

In an exemplary embodiment, the display panel may be a flexible display panel.

In an exemplary embodiment, the display panel may include a first substrate, a second substrate disposed opposite to the first substrate, and a light control layer interposed between the first and second substrates, where the first and second substrates may include a material having a flexibility.

In an exemplary embodiment, at least one of the first and second substrates may include a polymer.

In an exemplary embodiment, the display panel may be an organic light emitting display panel or a liquid crystal display panel.

In an exemplary embodiment, the vibration member may include a piezoelectric element, a polyvinylidene fluoride ("PVDF"), an electro active polymer or a combination thereof.

In an exemplary embodiment, the display apparatus may further include a signal generator which generates the sound signal in response to a sound data and applies the sound signal to the vibration member.

In an exemplary embodiment, the display panel may include a first area and a second area, the vibration member may include a first vibration member disposed in the first area and a second vibration member disposed in the second area, the sound signal may include a first sound signal and a second sound signal, the signal generator may apply the first and second sound signals to the first and second vibration members, respectively, and the first and second vibration members may vibrate the first and second areas, respectively, such that sounds output from the first and second areas are different from each other.

In an exemplary embodiment, the signal generator may generate the first and second sound signals based on vibration characteristics of the first and second areas.

According to exemplary embodiments described herein, the vibration member transfers the vibration to the display panel, and thus the display panel outputs the sound. Thus, in such embodiments, an intensity of sound pressure of the sound output through the display panel of the display apparatus that functions as a vibration plate is improved, and thus sound output from the display apparatus may have improved sound characteristics in the lower register.

BRIEF DESCRIPTION OF THE DRAWINGS

The above and other feature of the invention will become apparent by describing in further detail exemplary embodiments thereof with reference to the accompanying drawings, in which.

DETAILED DESCRIPTION

The inventions will now be described more fully hereinafter with reference to the accompanying drawings, in which various exemplary embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms, "a", "an" and "the" are intended to include the plural forms, including "at least one," unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 1:
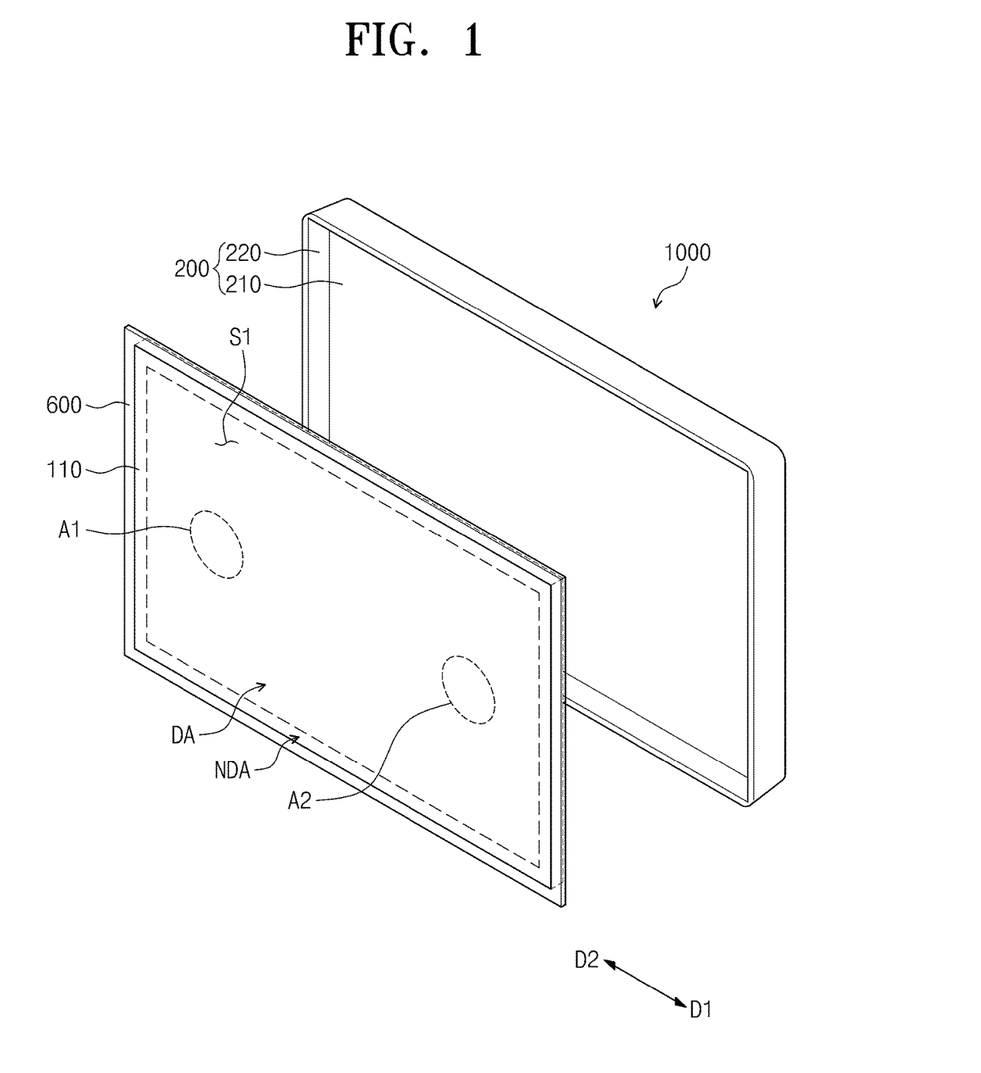
FIG. 1 is an exploded perspective view showing an exemplary embodiment of a display apparatus according to the invention.

FIG. 1 is an exploded perspective view showing an exemplary embodiment of a display apparatus 1000 according to the invention.

Referring to FIG. 1, an exemplary embodiment of the display apparatus 1000 includes a display panel 110 to display an image and a cover part 200 disposed at a rear or lower side of the display panel 110.

The display panel 110 displays image information, such as a text, a video, a photograph, a two-dimensional image or a three-dimensional image, for example. Elements or parts included in the display panel 110 may have flexibility, and the display panel 110 may be a flexible display panel configured to bend by an external force, but not being limited thereto or thereby. In an exemplary embodiment, the elements or parts included in the display panel 110 may have rigidity, and the display panel 110 may not be bent even though the external force is applied to the display panel 110.

In an exemplary embodiment, the display panel 110 may be one of various types of display panels, e.g., an organic light emitting display panel, a liquid crystal display panel, a plasma display panel or an electrophoretic display panel, for example.

The display panel 110 may have various shapes. In an exemplary embodiment, as shown in FIG. 1, the display panel 110 may have a rectangular plate shape with two pairs of sides, each pair having opposing sides that are equal to each other in length and angles with respect to the e adjacent sides. In such an embodiment, the display panel 110 may include short sides and long sides long longer than the short sides. Hereinafter, a direction in which the long sides extend is referred to as a first direction D1 and a direction opposite to the first direction D1 is referred to as a second direction D2. The display panel 110 includes a display area DA in which the image is displayed and a non-display area NDA surrounding the display area DA. The display panel 110 includes a first surface S1 on which the image is displayed and a second surface S2 opposite to the first surface S1. Herein, a side or direction in which the first surface S1 is facing may be referred to as an upper side or direction, and a side or direction in which the second surface S2 is facing may be referred to as a lower side or direction. Herein, the lower and upper directions may correspond to rear and front directions.

A plurality of pixels (not shown) is arranged in the display area DA substantially in a matrix form. The pixels generate the image corresponding to signals applied thereto. The image is not displayed in the non-display area NDA.

Figure 2:
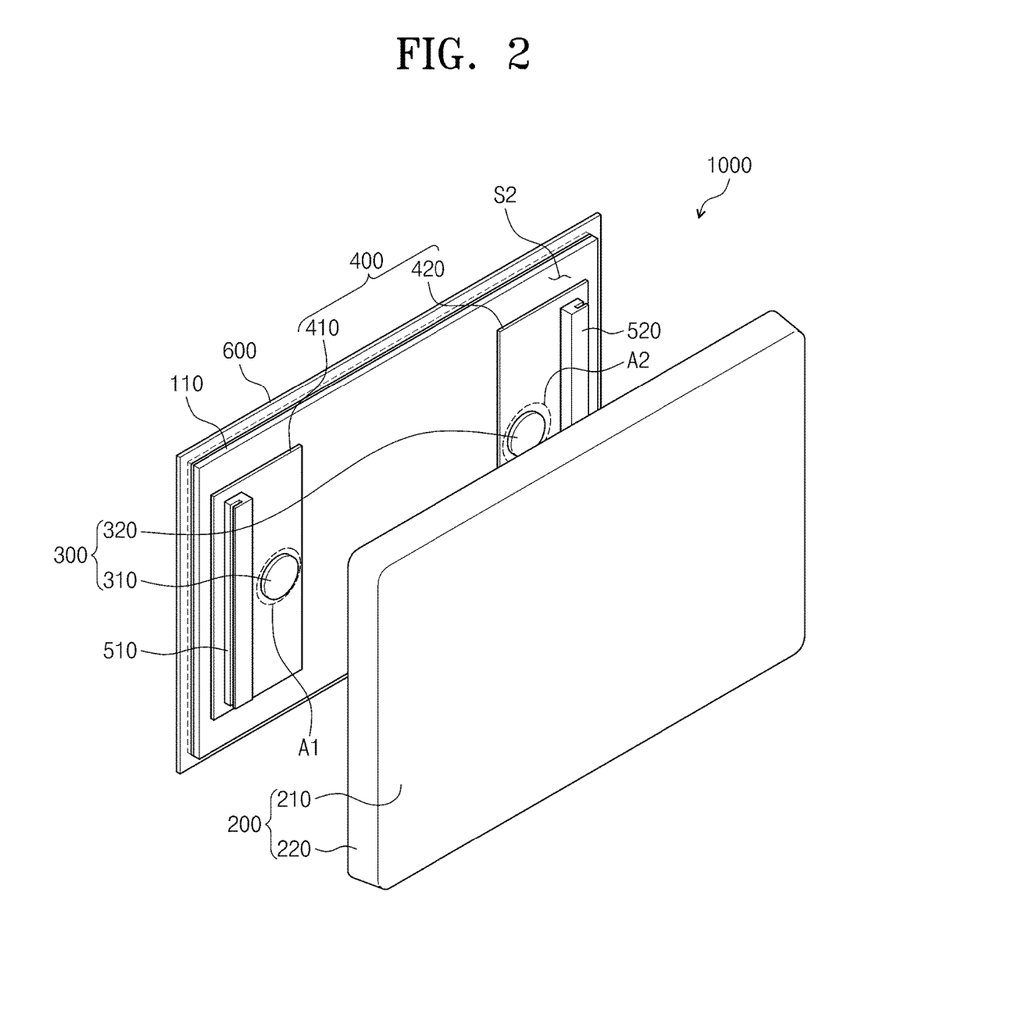
FIG. 2 is an exploded perspective view showing a rear portion of the display apparatus shown in FIG. 1.
Figure 3:
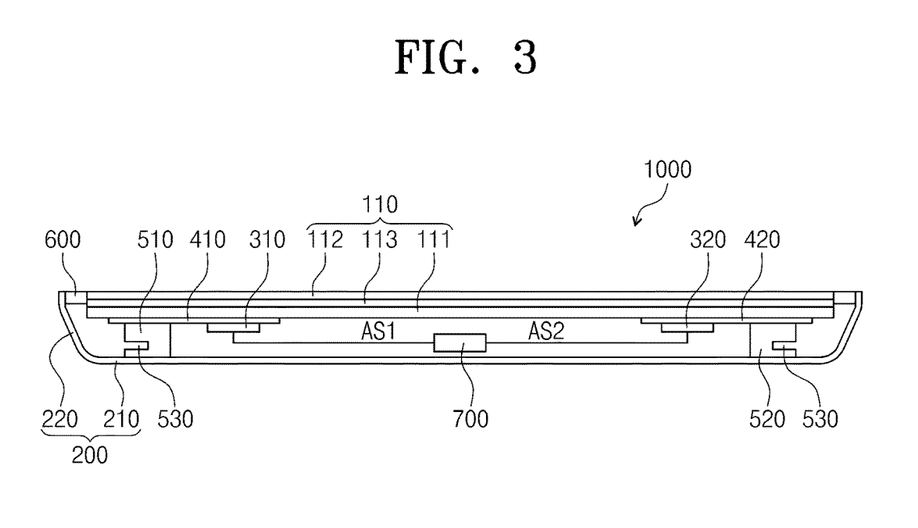
FIG. 3 is a cross-sectional view showing the display apparatus shown in FIG. 2.
Figure 4:
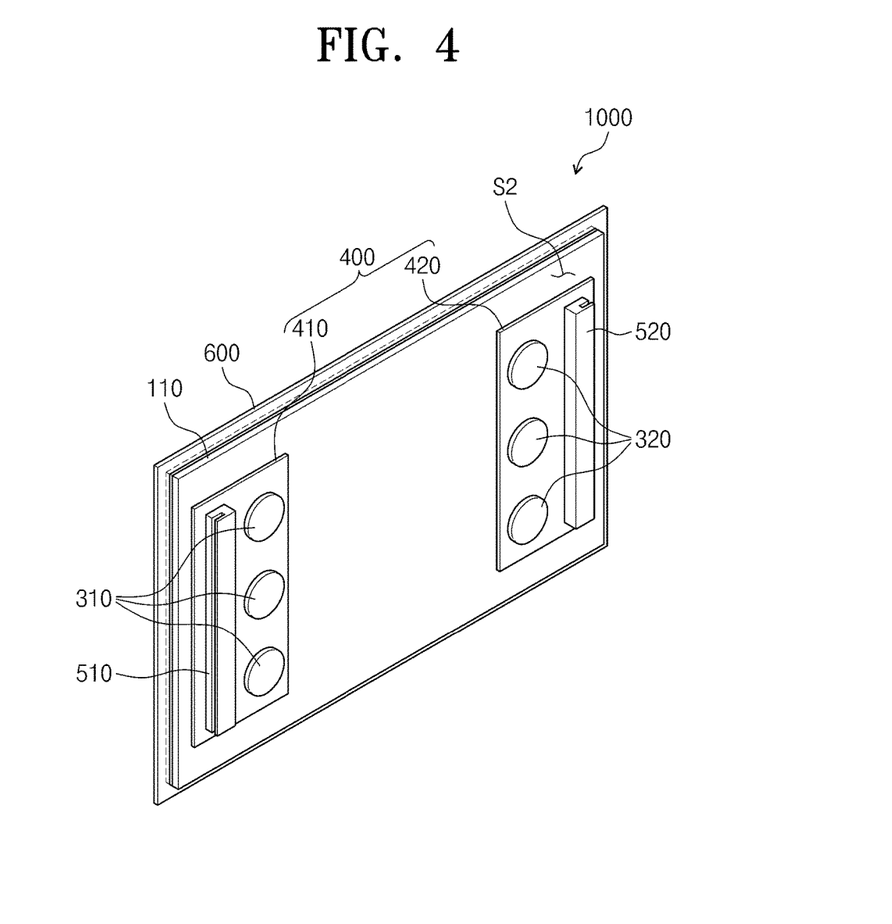
FIG. 4 is an exploded perspective view showing a rear portion of an alternative exemplary embodiment of a display apparatus according to the invention.

FIG. 2 is an exploded perspective view showing a rear portion of the display apparatus shown in FIG. 1, FIG. 3 is a cross-sectional view showing the display apparatus shown in FIG. 2, and FIG. 4 is an exploded perspective view showing a rear portion of an alternative exemplary embodiment of a display apparatus according to the invention.

Referring to FIGS. 2 and 3, in an exemplary embodiment, the display apparatus 1000 includes a vibration member (e.g., a vibration device or a vibrator) 300, a vibration control plate 400 disposed between the vibration member 300 and the display panel 110, a damping member (e.g., a damping device or a damper) disposed between and coupled to the cover part 200 and the display panel 110, and an edge 600.

The display panel 110 includes a first substrate 111, a second substrate 112 facing the first substrate 111, and a light control layer 113 disposed between the first and second substrates 111 and 112. Each of the first and second substrates 111 and 112 includes an electrode. The display panel 110 controls the image displayed in the light control layer 113 using an electric field generated in the light control layer from the electrodes. The light control layer 113 may be, but not limited to, one of an organic light emitting layer, a liquid crystal layer, a plasma forming layer, and an electrophoretic layer.

In one exemplary embodiment, for example, the display panel 110 includes a polarizer (not shown). The polarizer is attached to the first surface S1 or the second surface S2 of the display panel 110.

The cover part 200 covers the display panel 110, the vibration member 300, the damping member and the edge 600, and protects the display panel 110, the vibration member 300, the damping member and the edge 600 from external impacts.

The cover part 200 has a shape corresponding to a shape of the display panel 110. In one exemplary embodiment, for example, the cover part 200 may have a rectangular shape, as shown in FIG. 2, but not being limited thereto.

In an exemplary embodiment, the cover part 200 includes a bottom portion 210 and a sidewall 220. The sidewall 220 extends upward from four sides of the bottom portion 210, and the bottom portion 210 and the sidewall 220 define a receiving space. In such an embodiment, the display panel 110, the vibration member 300, the damping member and the edge 600 are disposed or accommodated in the receiving space.

The display apparatus 1000 further includes a signal generator 700 electrically connected to the vibration member 300 to apply an electric signal to the vibration member 300. The signal generator 700 generates a sound signal, which is the electric signal corresponding to sound data, and applies the sound signal to the vibration member 300. The signal generator 700 may receive the sound data from an external source (not shown). The sound data may correspond to an image, and may be provided to the signal generator 700 together with the image.

The vibration member 300 vibrates in response to the sound signal. The vibration member 300 includes a magnet and a coil that wraps around the magnet and flows a current corresponding to the sound signal. The vibration member 300 vibrates in response to an electromagnetic force corresponding to the current flowing through the coil. In an exemplary embodiment, the vibration member 300 may include a piezoelectric device. In such an embodiment, the piezoelectric device is mechanically deformed based on the sound signal, and thus the vibration member 300 vibrates based on the mechanical deformation of the piezoelectric device. The piezoelectric device may include at least one of a piezoelectric element, a polyvinylidene fluoride ("PVDF"), and an electro active polymer.

In an exemplary embodiment, the vibration control plate 400 is disposed between the vibration member 300 and the display panel 110. The vibration generated by the vibration member 300 is transferred to the display panel 110 through the vibration control plate 400. Accordingly, a frequency and an intensity of the vibration of the display panel 110 are controlled by the vibration control plate 400. In such an embodiment, vibration characteristics of the display panel 110 are controlled by the vibration control plate 400. In such an embodiment the frequency and intensity of the vibration may be controlled by controlling a thickness or material of the vibration control plate 400.

In an exemplary embodiment, the vibration member 300 is disposed on, e.g., attached to, a surface (e.g., a lower surface) of the vibration control plate 400, but not being limited thereto or thereby. In an alternative exemplary embodiment, the vibration member 300 may be attached to the second surface S2 of the display panel 110.

The edge 600 is disposed between the display panel 110 and the sidewall 220 and attached to the display panel 110 and the sidewall 220. In an exemplary embodiment, the edge 600 extends to the display panel 110 from an inner surface of the sidewall 220 and is attached to an edge of the display panel 110. The display panel 110 may be attached to the sidewall 220 via the edge 600 such that the display panel 110 vibrates in direction substantially perpendicular to a surface thereof. The edge 600 allows the display panel 110 to vibrate smoothly and elastically supports the display panel 110, and thus the display panel 110 moves in predetermined directions substantially perpendicular to a surface thereof, e.g., up and down directions. The edge 600 includes thermoplastic polyurethane, thermoplastic olefin, urethane form, polypropylene, rubber, polymer or a combination thereof. The edge 600 has a thickness thinner than a thickness of the display panel 110.

The damping member is attached to the vibration control plate 400 to attenuate the vibration of the display panel 110. In an exemplary embodiment, one end of the damping member is coupled to a lower surface of the vibration control plate 400, and the other end of the damping member is coupled to an upper surface of the bottom portion 210. Therefore, the vibration characteristics of the display panel 110 are controlled by the damping member. The damping member absorbs the vibration generated by the vibration member 300 and allows the vibration member 300 to vibrate in response to the sound signal. In an alternative exemplary embodiment, the damping member may be attached to the vibration member 300.

In an exemplary embodiment, the damping member includes an elastic body that generates a restoring force to support the display panel without losing the elastic force. In such an embodiment, the damping member includes a natural or synthetic polymer-based material, for example.

The vibration member 300 vibrates in response to the sound signal provided from the signal generator 700 and transfers the vibration to the display panel 110 through the vibration control plate 400. The display panel 110 vibrates in directions substantially perpendicular to a surface thereof, e.g., up and down directions, according to the vibration of the vibration member 300. In such an embodiment, the display panel 110 functions as a vibration plate of a speaker.

In general, the intensity of the sound pressure of the sound output from the vibration plate becomes high as the size of the vibration plate become large, and thus output characteristics of the sound in the lower register of the speaker may be improved. Thus, the intensity of the sound output through the display panel 110 and the output characteristics of the sound in the lower register of the display panel 110 may be determined based on the area of the display panel 110. In a conventional display apparatus, the size of the vibration plate of the speaker is substantially smaller than an area of a display panel thereof. In an exemplary embodiment, where of the display panel 110 functions as the vibration plate, the intensity of the sound output through the display panel 110 and the output characteristics of the sound in the lower register of the display panel 110 are substantially improved.

In an exemplary embodiment, as shown in FIG. 2, the vibration member 300 includes a first vibration member 310 and a second vibration member 320. In such an embodiment, the vibration control plate 400 includes a first vibration control plate 410 and a second vibration control plate 420. In one exemplary embodiment, for example, the first vibration control plate 410 and a second vibration control plate 420 extends along an extending direction of the short sides of the display panel 110, and spaced apart from each other in an extending direction of the long sides of the display panel 110. The first vibration control plate 410 is disposed in the first direction D1 with respect to a center portion of the display panel 110, and the second vibration control plate 420 is disposed in the second direction D2 with respect to the center portion of the display panel 110.

The first vibration member 310 is disposed on the first vibration control plate 410 to correspond to a first area A1 of the display panel 110, and the second vibration member 320 is disposed on the second vibration control plate 420 to correspond to a second area A2. When viewed from a front view of the display panel 110, the first vibration member 310 may be disposed at a side of the display panel 110 in the first direction, e.g., a right side, and the second vibration member 320 may be disposed at a side of the display panel 110 in the second direction, e.g., the left side.

The sound signal output from the signal generator 700 includes a first sound signal AS1 and a second sound signal AS2. The first vibration member 310 receives the first sound signal AS1 and vibrates in response to the first sound signal AS1, and thus the first area A1 is vibrated such that the sound is output through the first area A1. The second vibration member 320 receives the second sound signal AS2 and vibrates in response to the second sound signal AS2, and thus the second area A2 is vibrated such that the sound is output through the second area A2.

In an exemplary embodiment, the first and second vibration members 310 and 320 respectively vibrate the first and second areas A1 and A2, such that the first and second areas A1 and A2 may be differently vibrated. Accordingly, in such an embodiment, the display panel 110 may output the sound in a stereo scheme.

In an exemplary embodiment, the damping member includes a first damping member 510 attached to the first vibration control plate 410 and a second damping member 520 attached to the second vibration control plate 420. In such an embodiment, the first and second vibration members 310 and 320 are disposed between the first and second damping members 510 and 520.

In an exemplary embodiment, a damping control recess 530 is defined in each of the first and second damping members 510 and 520 in a direction substantially parallel to a surface of the display panel 110. The damping control recess 530 may be provided or formed by inwardly recessing a portion of a side surface of the damping member. The attenuation characteristics of the vibration of the damping member and the vibration characteristics of the display panel 110 are controlled by the damping control recess 530. Although not shown in figures, according to an alternative exemplary embodiment, each of the first and second damping members 510 and 520 may include a plurality of damping control recesses, or the first and second damping member 510 and 520 may have a spring shape.

In an exemplary embodiment, as shown in FIGS. 1 to 3, the vibration member 300 includes the first and second vibration members 310 and 320 disposed on the vibration control plate 400 to respectively correspond to the first and second areas A1 and A2, but exemplary embodiments of the invention are limited thereto or thereby. In one alternative exemplary embodiment, for example, a plurality of the first vibration members 310 and a plurality of second vibration members 320 may be disposed on the vibration control plate 400, as shown in FIG. 4.

Figure 5:
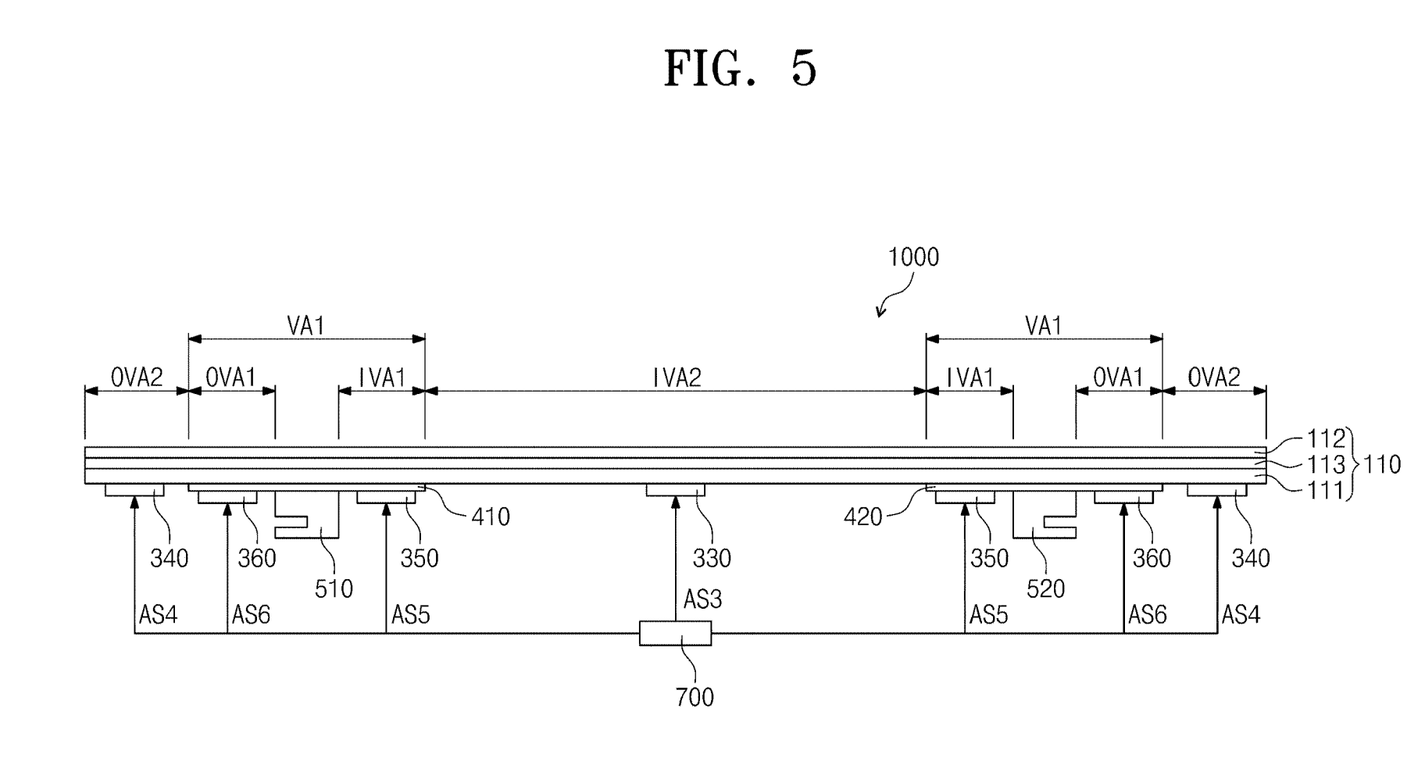
FIG. 5 is a cross-sectional view showing an alternative exemplary embodiment of a display apparatus according to the invention.

FIG. 5 is a cross-sectional view showing an alternative exemplary embodiment of a display apparatus according to the invention.

Referring to FIG. 5, in an exemplary embodiment, the display panel 110 includes a first vibration area VA1 corresponding to the vibration control plate 400 and a second vibration area except for the first vibration area VA1. The damping member may be provided along a boarder for the first vibration area VA1 and the second vibration area.

The first vibration area VA1 includes a first outer vibration area OVA1 defined in the outer area of the display panel 110 with respect to the damping member, and a first inner vibration area IVA1 defined in the inner area of the display panel 110 with respect to the damping member. The second vibration area includes a second outer vibration area OVA2 defined in the outer area of the display panel 110 with respect to the damping member, and a second inner vibration area IVA2 defined in the inner area of the display panel 110 with respect to the damping member.

The vibration member 300 includes first, second, third and fourth vibration members 330, 340, 350 and 360. In an exemplary embodiment, the first and second vibration member 330 and 340 are disposed on the display panel, and the third and fourth vibration member 350 and 360 are disposed on the vibration control plate 400, which is disposed on the display panel 110. In such an embodiment, the first vibration member 330 may be attached to the second surface S2 of the display panel 110 to correspond to the second inner vibration area IVA2. The second vibration member 340 may be attached to the second surface S2 of the display panel 110 to correspond to the second outer vibration area OVA2. The third vibration member 350 may be s attached to the lower surface of the vibration control plate 400 to correspond to the first inner vibration area IVA1. The fourth vibration member 360 may be attached to the lower surface of the vibration control plate 400 to correspond to the first outer vibration area OVA1.

The signal generator 700 applies first, second, third and fourth sound signals AS3, AS4, AS5 and AS6 to the first, second, third and fourth vibration members 330, 340, 350 and 360, respectively. The first to fourth vibration members 330 to 360 vibrate in response to the first to fourth sound signals AS3 to AS6, respectively, to vibrate the first outer vibration area OVA1, the first inner vibration area IVA1, the second outer vibration area OVA2 and the second inner vibration area IVA2.

The vibration characteristics of the first outer vibration area OVA1, the first inner vibration area IVA1, the second outer vibration area OVA2 and the second inner vibration area IVA2 are different from each other, and thus the output characteristics are different from each other in various registers.

In an exemplary embodiment, the first outer vibration area OVA1, the first inner vibration area IVA1, the second outer vibration area OVA2 and the second inner vibration area IVA2 have a first to fourth resonance frequency, respectively. The first to fourth resonance frequency may be determined by areas of corresponding vibration area. In one exemplary embodiment, for example, the first resonance frequency of the first outer vibration area OVA1 is higher than the second resonance frequency of the first inner vibration area IVA1 when the first outer vibration area OVA1 is smaller than the first inner vibration area IVA1.

The first, second, third and fourth vibration members 330, 340, 350 and 360 have first to fourth vibration ranges, respectively. The first to fourth resonance frequency may be included in the first to fourth vibration range, respectively. In one exemplary embodiment, for example, the first vibration range includes a frequency range from about 1 kilohertz (kHz) to about 20 kHz, and the second vibration range includes a frequency range from about 20 hertz (Hz) to about 1 kHz.

The signal generator 700 generates the first to fourth sound signals AS3 to AS6 based on the vibration characteristics of each of the first outer vibration area OVA1, the first inner vibration area IVA1, the second outer vibration area OVA2 and the second inner vibration area IVA2. In one exemplary embodiment, for instance, where the output characteristics of the sound in the lower register of the first inner vibration area IVA1 is superior compared to those of the other areas, the signal generator 700 applies the first sound signal AS3 to the first vibration member 330 to allow the first vibration member 330 to output the sound in the lower register.

Figure 6:
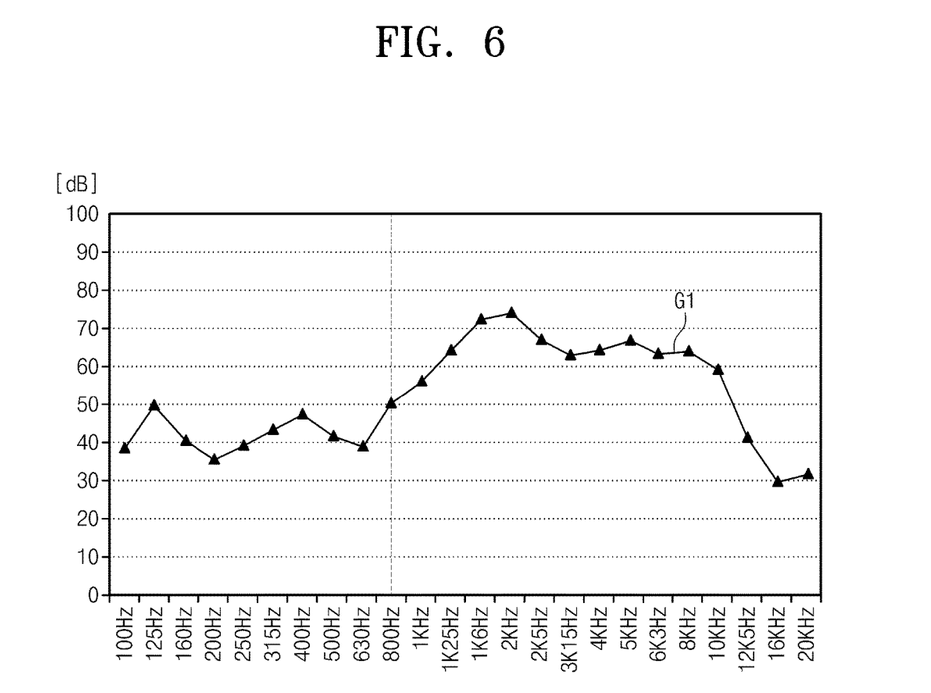
FIG. 6 is a graph showing an intensity of a sound pressure as a function of a frequency of a sound output through a conventional display apparatus including a speaker using a piezoelectric device.
Figure 7:
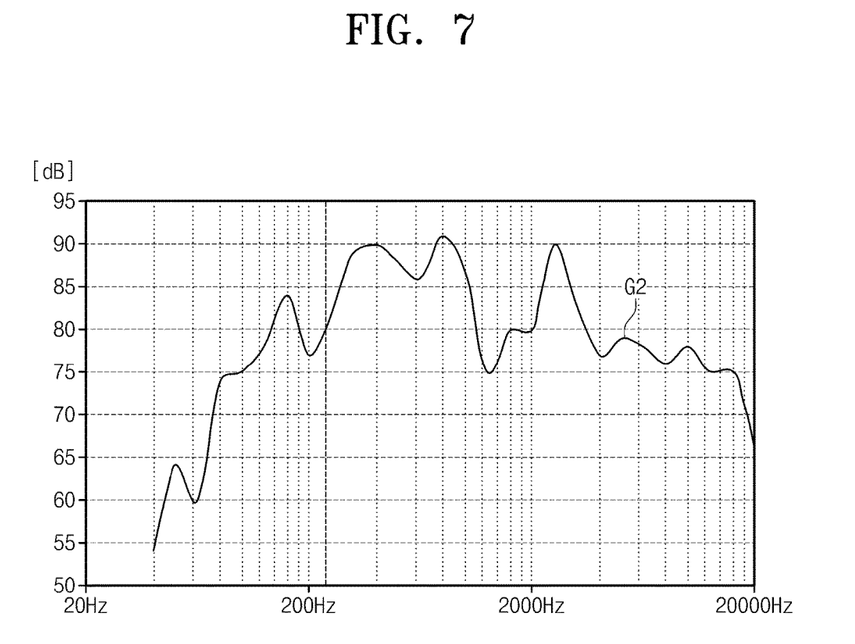
FIG. 7 is a graph showing an intensity of a sound pressure as a function of a frequency of a sound output from an exemplary embodiment of a display apparatus according to the invention.

FIG. 6 is a graph showing the intensity of the sound pressure as a function of the frequency of the sound output through a speaker of a conventional display apparatus including a piezoelectric device, and FIG. 7 is a graph showing the intensity of the sound pressure as a function of the frequency of the sound output from an exemplary embodiment of the display apparatus according to the invention.

In FIG. 6, an x-axis represents the frequency of the sound and a y-axis represents the intensity of the sound pressure. A first graph G1 shown in FIG. 6 represents the intensity of the sound pressure according to the frequency of the sound output through the speaker included in the conventional display apparatus. According to the first graph G1, the y-axis value becomes smaller than the intensity of the sound pressure of about 50 decibels (dB) in the register with the frequency lower than about 800 Hz.

In FIG. 7, an x-axis represents the frequency of the sound and a y-axis represents the intensity of the sound pressure. A second graph G2 shown in FIG. 7 represents the intensity of the sound pressure according to the frequency of the sound output of an exemplary embodiment of the display apparatus 1000. As shown in the first and second graphs G1 and G2, y-axis values of the second graph G2 are greater than those of the first graph G1 in the most area of the frequency area. Accordingly, the intensity of the sound pressure of an exemplary embodiment of the display apparatus 1000 is substantially improved.

As shown in FIG. 7, the y-axis value of the second graph G2 becomes smaller than the intensity of the sound pressure of about 80 dB in a register in a range from about 200 Hz to about 300 Hz. Accordingly, output characteristics of the sound in the lower register from an exemplary embodiment of the display apparatus 1000 are substantially improved.

Figure 8:
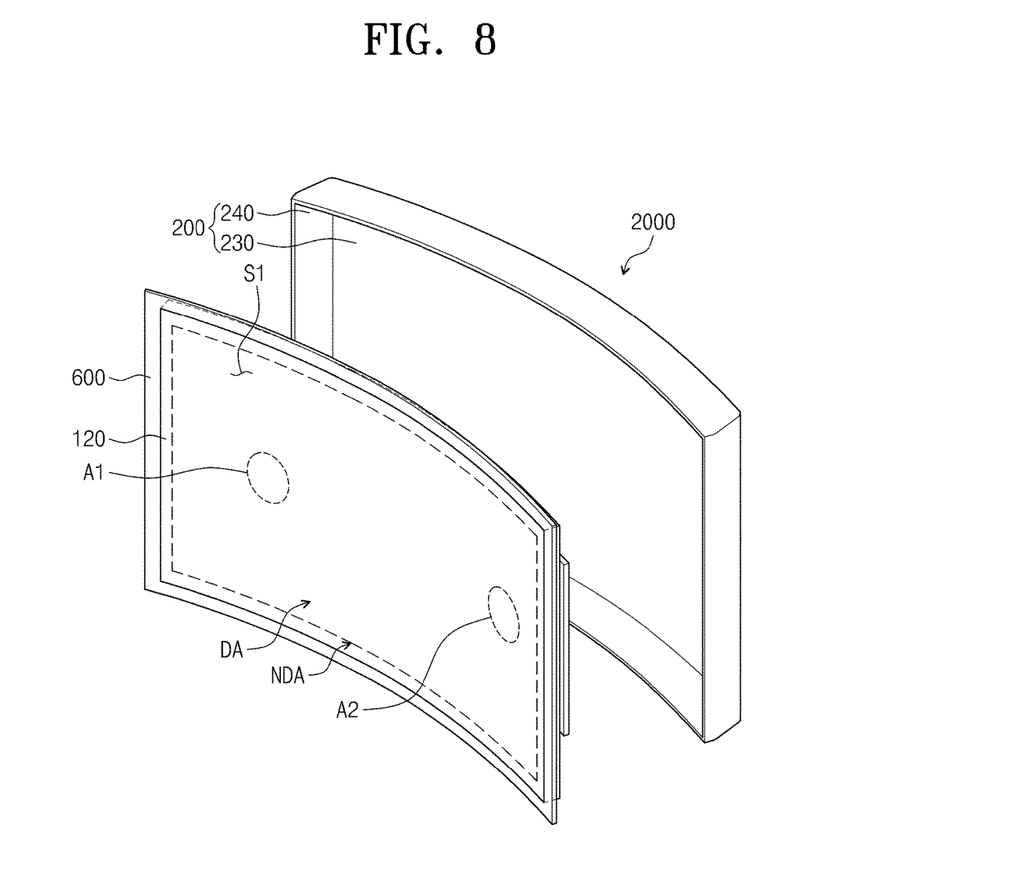
FIG. 8 is an exploded perspective view showing an alternative exemplary embodiment of a display apparatus according to the invention.
Figure 9:
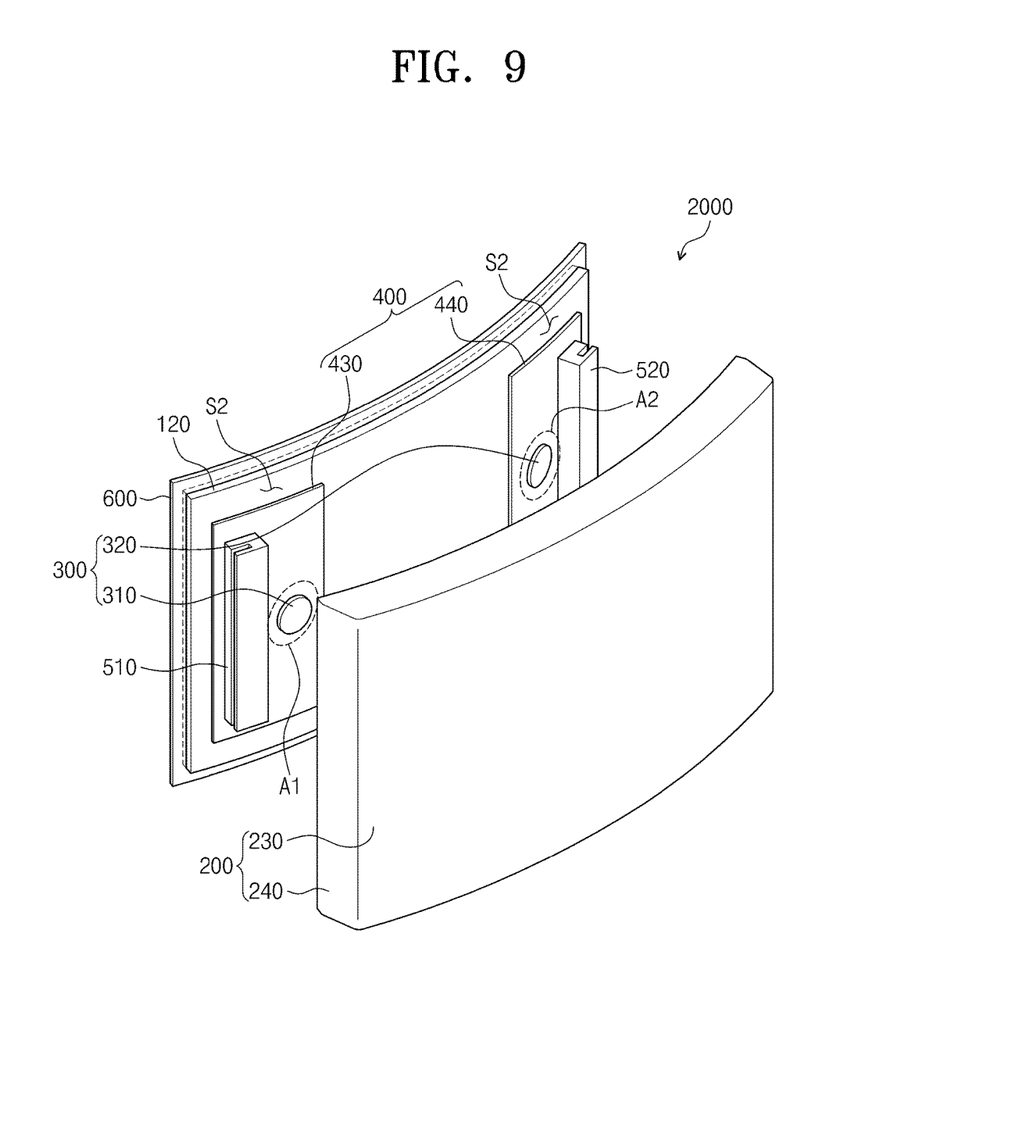
FIG. 9 is an exploded perspective view showing a rear portion of the display apparatus shown in FIG. 8.
Figure 10:
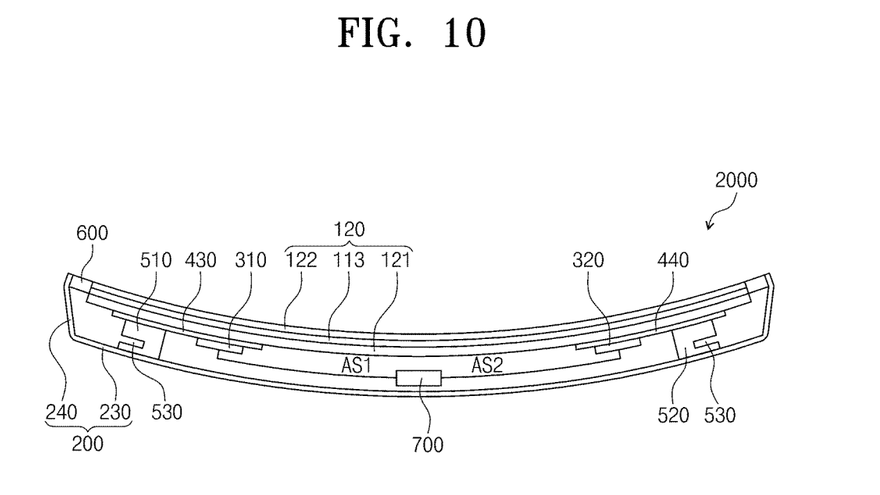
FIG. 10 is a cross-sectional view showing the display apparatus shown in FIG. 8.

FIG. 8 is an exploded perspective view showing an exemplary embodiment of a display apparatus 2000 according to the invention, FIG. 9 is an exploded perspective view showing a rear portion of the display apparatus shown in FIG. 8, and FIG. 10 is a cross-sectional view showing the display apparatus shown in FIG. 8.

The display apparatus 2000 shown in FIGS. 8 to 10 is substantially the same as the display apparatus 1000 shown in FIGS. 1 to 3 except for a shape thereof. The same or like elements shown in FIGS. 8 to 10 have been labeled with the same reference characters as used above to describe the exemplary embodiments of the as the display apparatus 1000 shown in FIGS. 1 to 3, and any repetitive detailed description thereof will hereinafter be omitted or simplified.

Referring to FIGS. 8 to 10, an exemplary embodiment of the display apparatus 2000 may be curved in at least one direction. In an exemplary embodiment, the display apparatus 2000 may be curved in the first direction D1, and the display area DA of the display apparatus 2000 has a curved shape in the first direction D1. In such an embodiment, the display apparatus 2000 displays the image having improved three-dimensional effect, sense of immersion (or immersiveness), and presence.

In an exemplary embodiment, as shown in FIG. 8, a display panel 120 of the display apparatus 2000 is curved along the first direction D1. Thus, in such an embodiment, a portion or entire of the first and second surfaces S1 and S2 is curved in the first direction D1.

Elements or devices included in the display panel 120 may include or be formed of a material having flexibility, and the display panel 120 may be a flexible display panel configured to bend by an external force. In an exemplary embodiment, first and second substrates 121 and 122 may include a material, e.g., polymer, having high light transmittance and flexibility.

However, exemplary embodiments of the invention are not limited thereto or thereby. In an alternative exemplary embodiment, the elements or devices included in the display panel 120 may have rigidity, and the display panel 120 may not be bent even though the external force is applied to the display panel 120.

A bottom portion 230 of the cover part 200 is curved in the first direction D1 to correspond to the curved shape of the display panel 120. A sidewall 240 of the cover part 200 extends upward from four sides of the bottom portion 230. The bottom portion 230 and the sidewall 240 define a receiving space, and the display panel 120, the vibration member 300, the damping member and the edge 600 are disposed or accommodated in the receiving space.

In such an embodiment, the vibration control plate 400 is curved in the first direction D1 to correspond to the curved shape of the display panel 120. Accordingly, the upper surface of the first and second vibration control plates 430 and 440 are attached to the display panel 120 to be adhered to the second surface S2 of the display panel 120.

The edge 600 is disposed between the display panel 110 and the sidewall 220 and attached to the display panel 110 and the sidewall 220. The edge 600 is attached to the edge of the display panel 120 to correspond to the curved shape of the display panel 100. The vibration member 300 is attached to the lower surface of the vibration control plate 400, but not being limited thereto or thereby. In an alternative exemplary embodiment, the vibration member 300 may be attached to the second surface S2 of the display panel 120.

The vibration member 300 vibrates in response to the sound signal provided from the signal generator 700 and transfers the vibration to the display panel 120 through the vibration control plate 400. The display panel 120 vibrates in the directions substantially perpendicular to a surface thereof, e.g., up and down directions, in accordance with the vibration and outputs the sound. In such an embodiment, the display panel 120 functions as the vibration plate of the speaker.

The output characteristics of the sound output from the display panel 120 may be controlled by the curved shape of the display panel 120. In one exemplary embodiment, for example, the display apparatus 2000 may concentrate the sound output from the display panel 120 at a predetermined or specific position in accordance with a curvature of the display panel 120. In an exemplary embodiment, the display panel 120 may have a curvature corresponding to a radius in a range from about 3,000 millimeters (mm) to about 6,000 mm, but not being limited thereto or thereby. In an alternative exemplary embodiment, the display panel 120 may have a parabolic shape in cross-section.

In an exemplary embodiment, the display area DA may include a first sub display area (not shown) and a second sub display area (not shown). In such an embodiment, the first sub display area may be curved along a predetermined direction, and the second sub display area may not be curved. The second sub display area may have a flat shape.

The vibration control plate 400 and the vibration member 300 may be provided to correspond to, e.g., disposed in, the second sub display area. The vibration control plate 400 and the vibration member 300 may not overlap the first sub display area. Bending stress generated from the first sub display area may be larger than bending stress generated from the second sub display area since the first sub display area is curved and the second sub display area is not curved. Therefore, the first sub display area may be effectively prevented from being damaged by the vibration with a large magnitude by disposing the vibration control plate 400 and the vibration member 300 only in the second sub display area and outside the first sub display area.

Although some exemplary embodiments of the invention have been described herein, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
a display panel which displays an image;
a vibrator attached to a surface of the display panel; and
a damper disposed on the surface of the display panel,
wherein the vibrator receives a sound signal, generates a vibration in response to the sound signal, and transfers the vibration to the display panel to allow the display panel to vibrate and to output a sound,
a damping control recess is defined in a side surface of the damper,
the side surface of the damper is substantially perpendicular to the surface of the display panel, and
inner opposite surfaces and an inner side surface connecting the inner opposite surfaces define the damping recess such that the inner opposite surfaces are substantially parallel to the surface of the display panel and the inner side surface is substantially perpendicular to the surface of the display panel,
wherein the damper absorbs the vibration of the display panel, and
wherein the damping control recess controls the vibration characteristics of the display panel.

2. The display apparatus of claim 1, wherein
the display panel comprises:
a first surface which displays the image thereon; and
a second surface opposite to the first surface, and
the vibrator is attached to the second surface.

3. The display apparatus of claim 1, further comprising:
a vibration control plate disposed between the vibrator and the display panel, wherein the vibration control plate controls a vibration frequency of the vibration transferred to the display panel from the vibrator.

4. The display apparatus of claim 3, wherein the vibrator is attached to a surface of the vibration control plate.

5. The display apparatus of claim 3, further comprising:
the damper attached to at least one of the vibration control plate and the vibrator.

6. The display apparatus of claim 5, further comprising:
a cover part which covers the display panel, the vibrator and the damper.

7. The display apparatus of claim 6, wherein
the cover part comprises a bottom portion, and a sidewall extending from the bottom portion,
the display apparatus further comprises an edge attached to the sidewall, and
the display panel is coupled to the sidewall by the edge such that the display panel vibrates in directions substantially perpendicular to a surface thereof.

8. The display apparatus of claim 6, wherein the damper is coupled to the cover part.

9. The display apparatus of claim 5, wherein the damper comprises:
a first damper disposed at a side of the display panel in a first direction; and
a second damper disposed at a side of the display panel in a second direction opposite to the first direction,
wherein the vibrator is disposed between the first and second dampers.

10. The display apparatus of claim 5, wherein
the damper comprises:
a first damper disposed at a side of the display panel in a first direction; and
a second damper disposed at a side of the display panel in a second direction opposite to the first direction, and
the vibrator comprises:
a first vibrator disposed in the first direction from the first damper; and
a second vibrator disposed in the second direction from the second damper.

11. The display apparatus of claim 1, wherein the display panel has a display area which displays an image and includes a first sub display area which has a curved shape.

12. The display apparatus of claim 11, wherein
the display area includes a second sub display area which is not curved, and
the vibration control plate and the vibrator are disposed in the second sub display area.

13. The display apparatus of claim 11, wherein the vibrator is disposed outside the first sub display area.

14. The display apparatus of claim 1, wherein the display panel is a flexible display panel.

15. The display apparatus of claim 14, wherein the display panel comprises:
a first substrate;
a second substrate disposed opposite to the first substrate; and
a light control layer interposed between the first and second substrates,
wherein each of the first and second substrates comprises a material having a flexibility.

16. The display apparatus of claim 15, wherein at least one of the first and second substrates comprises a polymer.

17. The display apparatus of claim 1, wherein the display panel is an organic light emitting display panel or a liquid crystal display panel.

18. The display apparatus of claim 1, wherein the vibrator comprises a piezoelectric element, a polyvinylidene fluoride, an electro active polymer or a combination thereof.

19. The display apparatus of claim 1, further comprising:
a signal generator which generates the sound signal in response to a sound data and applies the sound signal to the vibrator.

20. The display apparatus of claim 19, wherein
the display panel comprises a first area and a second area,
the vibrator comprises a first vibrator disposed in the first area and a second vibrator disposed in the second area,
the sound signal comprises a first sound signal and a second sound signal,
the signal generator applies the first and second sound signals to the first and second vibrators, respectively, and
the first and second vibrators vibrate the first and second areas, respectively, such that sounds output from the first and second areas are different from each other.

21. The display apparatus of claim 20, wherein the signal generator generates the first and second sound signals based on vibration characteristics of the first and second areas.

22. A display apparatus comprising:
a display panel;
a vibrator attached to a surface of the display panel, wherein the vibrator receives a sound signal, generates a vibration in response to the sound signal, and transfers the vibration to the display panel to allow the display panel to vibrate and to output a sound;
a damper which absorbs the vibration of the display panel;
a cover part which covers the display panel, the vibrator and the damper therein;
wherein the damper includes a first end which couples to the display panel and a second end which couples to the cover part,
a damping control recess is defined in a side surface of the damper,
the side surface of the damper is substantially perpendicular to the surface of the display panel, and
inner opposite surfaces and an inner side surface connecting the inner opposite surfaces define the damping recess such that the inner opposite surfaces are parallel to the surface of the display panel and the inner side surface is perpendicular to the surface of the display panel,
wherein the damper absorbs the vibration of the display panel, and
wherein the damping control recess controls the vibration characteristics of the display panel.

23. The display apparatus of claim 22, wherein the display panel includes a first vibration area having a first resonance frequency and a second vibration area having a second resonance frequency.

24. The display apparatus of claim 23, wherein the damper is disposed along a boarder of the first and second vibration areas.

25. The display apparatus of claim 24, wherein
the vibrator includes a first sub vibrator having a first vibration range and a second sub vibrator having a second vibration range,
the first resonance frequency is in the first vibration range, and
the second resonance frequency is in the second vibration range.

26. The display apparatus of claim 25, wherein the first and second sub vibrator vibrate the first and second vibration area, respectively.

27. The display apparatus of claim 26, wherein
the first resonance frequency is higher than the second resonance frequency, and
the first vibration area is larger than the second vibration area.

28. The display apparatus of claim 27, wherein
the first vibration range includes a frequency range from about 1 kHz to about 20 kHz, and
the second vibration range includes a frequency range from about 20 Hz to about 1 kHz.

29. The display apparatus of claim 22, wherein the vibrator includes a first sub vibrator having a first vibration range and a second sub vibrator having a second vibration range.

30. A display apparatus comprising:
a display panel which comprises a first vibration area and a second vibration area;
a vibrator attached to a surface of the display panel, and which comprises a first vibrator disposed in the first vibration area and a second vibrator disposed in the second vibration area;
a damper disposed on the surface of the display panel, and
a signal generator which generates a sound signal in response to a sound data and applies the sound signal to the first and second vibrators, respectively,
wherein the first and second vibrators vibrate the first and second vibration areas, respectively, such that sounds output from the first and second vibration areas are different from each other,
a damping control recess is defined in a side surface of the damper,
the side surface of the damper is substantially perpendicular to the surface of the display panel, and
inner opposite surfaces and an inner side surface connecting the inner opposite surfaces define the damping recess such that the inner opposite surfaces are parallel to the surface of the display panel and the inner side surface is perpendicular to the surface of the display panel,
wherein the damper absorbs the vibration of the display panel, and
wherein the damping control recess controls the vibration characteristics of the display panel.

* * * * *